United States Patent Office 3,660,372
Patented May 2, 1972

3,660,372
BIPHENYL CONTAINING DIAZONIUM
FLUORIDE COMPOUNDS
Erwin F. Schoenewaldt, Watchung, and George G. Hazen and Richard F. Shuman, Westfield, N.J., assignors to Merck & Co., Inc., Rahway, N.J.
No Drawing. Filed July 31, 1968, Ser. No. 748,922
Int. Cl. C07c 113/00
U.S. Cl. 260—141                                      1 Claim

ABSTRACT OF THE DISCLOSURE

The invention relates to various novel 5-(4-fluoro substituted phenyl) salicylic acid and derivatives thereof. These compounds are useful intermediates for preparing 5-(4-fluorophenyl) salicylic acids and derivatives thereof which latter compounds are useful anti-inflammatory agents. These compounds are prepared by decomposition of the intermediate diazonium fluorides.

This invention relates to and has for its object the provision of new methods for obtaining certain chemical compounds and to new starting materials which are useful in said method. It relates more particularly to a method of obtaining 5 - (4 - fluorophenyl)-salicylic acid and the O-acetyl derivative thereof which may be characterized by the Formula I:

I wherein A is either hydrogen or acetyl. These compounds are useful as anti-inflammatory agents and are effective in the prevention and inhibition of edema and granuloma tissue formation. In addition, they have antipyretic and analgesic activity.

The present invention is based on the discovery that compounds of Formula I can be obtained by the introduction of a nuclear fluoro substituent into compounds of the Formula II:

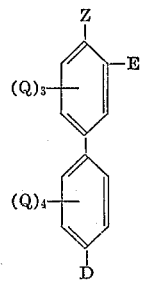

II wherein Z is hydroxyl, acetoxy or a group convertible thereto under reaction conditions; E is carboxyl or a group convertible thereto under reaction conditions; D is a group convertible to fluorine such as a fluoro-containing or fluorine-free diazonium radical (XR)+Y− (wherein X is Cl, Br or I, R is alkyl or aryl and Y is an anion), fluorosulfonyl, fluorosulfinyl, fluorocarbonyl, fluorocarbonyloxy, thiofluoroformyl, hydroperoxyalkyl, bromo, chloro, iodo, hydroxy, sulfo, mesyloxy, tosyloxy or hydrogen; and each Q is independently either hydrogen or a group convertible thereto under reaction conditions.

The reactions suitable for the conversion of compounds of Formula II to the desired products are classifiable as decomposition reactions in which a fluorine containing radical is decomposed to give the nuclear fluoro radical; or displacement reactions in which a fluorine-free radical is displaced by fluorine; or simple fluorination in which fluorine is added at a 4-unsubstituted position of the 5-phenyl substituent. Each reaction can, by proper adjustment of conditions whereby a source of acetyl ions is present (e.g., an acetylating agent such as an acetyl halide, typically acetyl chloride), give either of the two compounds of Formula I. In each case, the starting material of Formula II may have one or more Q radicals which are displaced by hydrogen and I and E radicals which are converted to hydroxy or acetoxy and carboxyl radicals, respectively, under the particular conditions of reaction leading to the introduction of the 4-fluoro substituent. These modifications of the process of this invention will be described in greater detail hereinafter.

Conversion of compounds of Formula II wherein D is a fluorine-containing radical such as a diazonium or acyl radical, to a compound of Formula I is accomplished by decomposition of the fluoro-containing diazo or acyl radical (to eliminate nitrogen in the case of a diazo radical) thereby forming the C—F bond. Typical diazo groups are diazonium fluoride or complex diazonium fluorides such as diazonium fluoroborate, diazonium fluorophosphate, diazonium silicofluoride, diazonium antimony fluoride, etc. Other fluorine-containing radicals which can be decomposed to give the desired product are fluorosulfonyl (—SO₂—F), fluorosulfinyl (—SO—F), fluoroformyl (—CO—F), fluorocarbonyloxy (—O—CO—F)

thiofluorocarbonyloxy (—S—CO—F) radicals, difluorophosphono (—POF₂), difluorophosphino (—PF₂), tetrafluorophospho (—PF₄), difluoroarsono (—AsOF₂) and p-anisyliodonium fluoride [(CH₃O—φ—I⁺)F⁻].

Decomposition of the fluorine-containing diazonium compounds of Formula II to form the desired compounds of Formula I may be accomplished by aging of the diazonium starting material. Aging may be accomplished at any temperature between the freezing point and the temperature at which starting materials or final products undergo undesirable decomposition. This temperature range occurs between 0° and 400° C. with the narrower range of 60° to 100° C. being preferred. Aging conditions may be maintained until some decompostion ha soccurred with the formation of the desired C—F bond. Significant yields are obtainable if aging conditions are maintained from about one to eighteen hours. During reaction, nitrogen is evolved and it is convenient to maintain reaction conditions until the evolution of nitrogen has subsided. The reaction may be conducted in the presence of a diluent which does not interfere with the desired reaction. Use of the diluent may tend to improve the rate of reaction or the yield of desired product. Suitable diluents are materials such as dimethylsulfoxide, dimethylformamide, tetrahydrofuran, and the like.

The diazonium compounds of Formula II useful in the process of the present invention, are readily obtainable from the corresponding 4′-amino derivatives by diazotization of the latter in the presence of a fluorinating agent such as hydrogen fluoride and fluosilicic acid. Alternatively, diazotization can be accomplished in the presence of an anion other than fluoride and the fluoride ion then introduced by anion interchange using a source of fluoride ions. In the starting material, Z may be hydroxy or acetoxy or another radical such as methoxy, propionyloxy or benzyloxy, which is convertible to hydroxy or acetoxy under conditions of reaction. The radical E may be carboxy or another radical such as hydroxalyl, acetoxycarbonyloxy or carbomethoxy, which, under the conditions of reaction, is convertible to carboxy. Each Q radical may be hydrogen or a labile carboxy or hydroxyalyl radical, which, under the conditions of reaction, is convertible to hydrogen. When the radical Z is hydroxy, it is nevertheless possible to obtain the compound of Formula I wherein A is acetyl by the inclusion of a source of acetyl ions in the reaction mixture. Under the conditions of reaction, an acetylating agent such as acetyl chloride or acetic anhydride, will provide the acetyl ions necessary for the preparation of the compound of Formula I wherein A is acetyl.

When the radical D in the starting material of Formula II is a fluorine-containing acyl radical such as is described above, several methods may be employed for the production of the desired material of Formula I. Aging the starting material at a temperature between the freezing point of the reaction mixture and the point at which undesirable decomposition occurs, will result in the desired transformation. Reaction rates may be increased by irradiation with a strong light source or by the use of a catalyst such as platinum wire or transition metal complexes, coordination compounds or ions such as tris(triphenyl phosphine) rhodium chloride, tetrakis(triphenylphosphine) ruthenium dichloride, tris(triphenylphosphine) iridium chloride or catalysts such as boron trifluoride or aluminum fluoride by contacting the starting material with a tertiary amine such as pyridine, quinoline, triethylamine, or N-ethylpiperidine, especially at elevated temperature, e.g. between 100° and 300° C., the desired decomposition leading to a C—F bond is achieved. Depending upon the content of the fluoride-containing radical to be degraded, reaction is accompanied by the evolution of either sulfur dioxide, carbon dioxide or carbon monoxide. The reaction may be conducted in the presence or absence of a diluent. Suitable diluents are substances of the inert type typified by biphenyl, dimethylsulfoxide, sand and Freon. When catalysts are employed, the proportion of catalyst to starting material is not critical. However, reaction rates will, in general, be raised by using more than a trace amount of catalyst. Large excesses of catalysts may be used; but for purposes of economy it is preferable to use between 0.01 and 0.5 mole of catalyst per mole of starting material.

The starting materials of Formula II wherein D is a fluorinated acyl radical can be synthesized by reaction of 5-phenylsalicylic acid or a derivative thereof with fluorosulfonic acid, fluoroformyl chloride, fluorothioformyl chloride or fluorosulfinic acid. The desired fluorine containing group may also be introduced by formylation, halo formylation (fluoro excepted), sulfonation or halosulfonation of 5-phenylsalicylic acid or a derivative thereof followed by replacement of a halogen (fluorine excepted) on the group which is introduced with fluorine using a fluorinating agent such as a metal fluoride or alternatively using phosphorous trichloride or phosphorous oxychloride, followed by treatment with a metal fluoride. The desired starting material may alternatively be obtained by treatment of the diazo compound of 5-(4-aminophenyl) salicylic acid with a strong aqueous acid followed by fluorocarbonyl chloride or thionyl chloride. The latter may then be converted to the fluoro-containing-acyl group by replacing chlorine through the action of a metal fluoride.

Useful starting materials wherein the radical D is a fluoroacyl radical are those wherein Z is an hydroxy or an acyloxy group, E is a carboxy group and each Q is hydrogen, as well as such other materials wherein Z, E and Q are convertible to the named values under reaction conditions. Thus, if I in the starting material in the reaction under consideration is methoxy, propionyloxy or metaloxy during the course of the reaction to form the compound of Formula I it will be converted to an hydroxy or acetoxy radical. Similarly, if E is a hydroxalyl, carboalkoxalyl or acetoxycarbonyloxy radical during the course of the reaction to give the 4'-fluoro substituent, E will be converted to a carboxy radical. Likewise, starting materials wherein Q is carboxyl or hydroxalyl can be used since such substituents are displaced by hydrogen under reaction conditions. If the reaction is conducted in the presence of acetyl ions which may be provided by an acetylating agent such as acetyl chloride or acetic anhydride, the compound of Formula I wherein A is acetyl will be obtained. Otherwise the product of reaction will be the compound of Formula I wherein A is hydrogen. Compounds of Formula II wherein D is a halogen other than fluorine, hydroxy, mesyloxy, sulfo or hydroperoxy can be converted to the desired compounds of Formula I by treatment with a fluorinating agent under suitable reaction conditions. When D is a tertiary hydroperoxy radical such as the 2-hydroperoxy-2-propyl radical, treatment with a reagent such as hydrogen fluoride, hydrofluoric acid, fluoboric acid, fluosilicic acid or phosphorus pentafluoride in the presence of hydrogen fluoride results in the desired conversion. The recation can be conducted in the presence of a diluent such as an inert substance typified by hexafluoroethane or dimethylsulfoxide at any temperature, preferably at a temperature between —80° C. and 100° C. The proportions of reactants are not critical since minor amounts of the fluorinating agent are capable of effecting the desired conversion. It is preferred to use approximately equimolar amounts of the fluorinating agent and the compound of Formula II. After treatment with the fluorinating agent, the reaction mixture may be diluted with water and allowed to age, preferably at an elevated temperature between about 100° C. and 400° C. whereby the desired 4-fluoro derivative of Formula I is obtained. In the starting material, I may be hydroxy or acetoxy, E may be carboxy and each Q radical may be hydrogen. In this event, the compound of Formula II is converted to the compound of Formula I without any change other than the introduction of the 4-fluoro radical. It is also possible to use as starting materials, compounds wherein Z, E and Q are radicals which under the conditions of reaction are convertible to hydroxy or acetoxy, carboxy and hydrogen, respectively. If Z is either methoxy, propionyloxy or metaloxy, fluorination will concomitantly convert it to hydroxy. If E is hydroxalyl, carbomethoxy or acetoxycarbonyloxy, it will be converted to carboxy under the conditions of reaction. Likewise, when Q is carboxy, sulfinyl or carbethoxy, each Q radical will be displaced by hydrogen during fluorination reaction. The reaction can be conducted in the presence or absence of a source of acetyl ions whereby the compound of Formula I wherein A is acetyl or A is hydrogen, respectively, is produced.

The conversion of compounds of Formula II wherein D is bromo, chloro, iodo, hydroxy, mesyloxy or sulfo is effected by treatment with a fluorinating agent such as an alkali fluoride (e.g., anhydrous, potassium or cesium fluoride), an alkaline earth fluoride or antimony trifluoride. The reaction may be run in a melt or in an inert, preferably polar aprotic solvent, such as dimethylsulfoxide or dimethylformamide. Treatment is conducted at any temperature at which either the starting material or the final product do not undergo undesirable decomposition; preferably a temperature in the range of 75°–250° C. is employed. Proportions of reagents are not critical. However, best yields are obtained when an excess of fluorinating agent is used. It is feasible to employ starting materials wherein D, E and Q radicals are convertible under the conditions of reaction to the functions shown in Formula I. Thus, if in the starting material, I is metaloxy or alkoxyl, E is carboxy, hydroxalyl or carboethoxy and any Q radical is carboxy or hydroxalyl, the reaction conditions will effect the concomitant conversion of these materials to the desired functionalities. The reaction may be conducted in the presence or absence of a source of acetyl ions in which case the compound of Formula I wherein A is acetyl or hydrogen, respectively, is obtained.

Starting materials of Formula II wherein D is a hydroperoxy radical are obtained by the reaction of meta-aminosalicylic acid and a secondary alkyl benzene such as cumene in the presence of iso-amyl nitrite, yielding 5-(4-alkylphenyl)salicylic acid which, on treatment with air, gives the desired 5-(4-hydroperoxyalkylphenyl)salicylic acid. A suitable alkyl benzene is cumene, the use of which in the foregoing reaction yields 5-[4-2-hydroperoxy-2-propyl-phenyl]salicylic acid.

Starting materials of Formula II wherein D is $(XR^+)\ Y^-$ are obtainable by reaction of a 5-phenylsalicylic acid with the compound RX under conditions such that addition of RX through X, occurs at the 4'-position of the phenylsalicylic acid starting material. Suitable reagents to accomplish this recation are an oxidizing agent (e.g. hydrogen peroxide) and an acidic material (such as acetic anhydride or the like). Among other D radicals which can be introduced into 5-phenylsalicylic acid by this method, are p-nitrophenyliodonium and phenylbromonium tetrafluoroborate, fluoride, sulfate, acetate, etc.

Starting materials of Formula II wherein D is a halogen other than fluorine are obtained by a series of reactions depicted by the following equation wherein X is bromo, chloro or iodo.

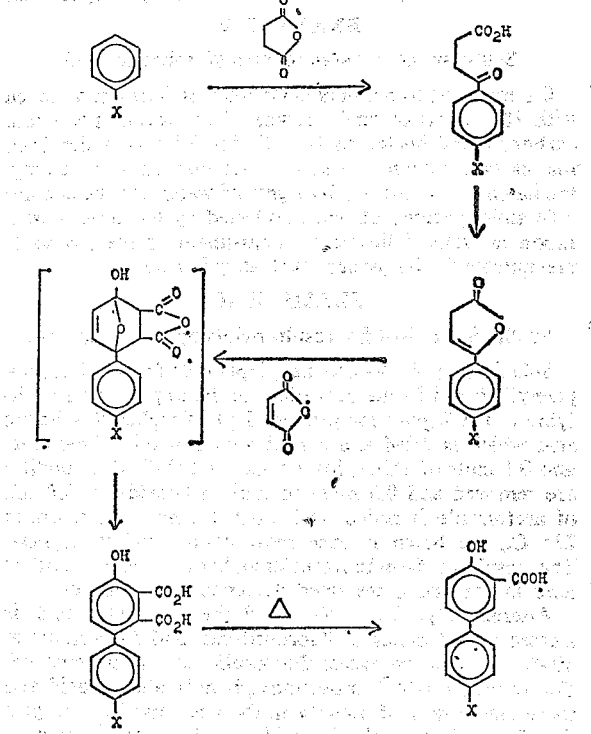

Thus, halobenzene is reacted with succinic anhydride in a Friedel-Crafts reaction to give 3-(4-halobenzoyl)propionic acid which is converted to the enol lactone 5-(4-halophenyl)-2-furanone. The latter compound is reacted with maleic anhydride in a Diels-Alder reaction to give 3-hydroxy-6-(4-halophenyl)phthalic acid via the transient endo- and exo-intermediates. The 3 - hydroxy - 6 - (4-halophenyl)phthalic acid may be thermally decarboxylated to form 5-(4-halophenyl)salicylic acid. The latter may also be prepared by a Gomberg-Bachmann condensation of 5-aminosalicylic acid and a halogenzene.

The starting materials of Formula II wherein D is mesyloxy or tosyloxy are obtained by the foregoing sequence of reactions starting with mesyloxy- or tosyloxy-benzene in place of the halobenzene used above. Alternatively, they can be obtained by Gomberg-Bachmann condensation of 5-aminosalicylic acid with phenyl-methane sulfonate or phenyl-p-toluenesulfonate.

The compounds of Formula II wherein D is hydroxy are obtained by the foregoing sequence of reactions starting with either phenol or an ester thereof such as O-benzoylphenol. In the latter case, an hydrolysis step must be added to remove the benzoyl group.

The compounds of Formula II wherein D is sulfo are obtained by the foregoing sequence of reactions using benzenesulfonic acid instead of the halobenzene; or alternatively, the following sequence of reactions may be used:

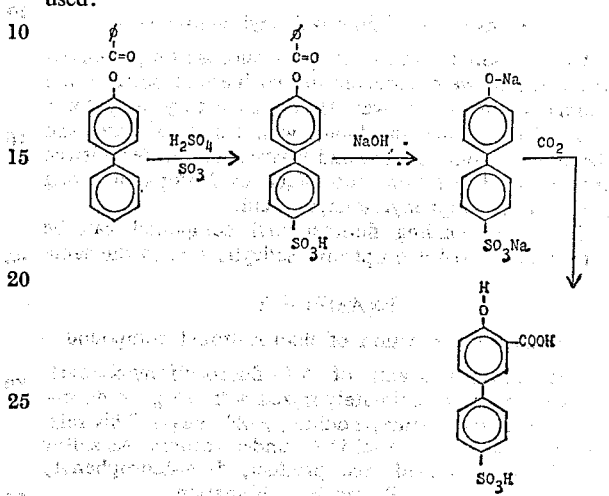

In the foregoing sequence, 4-phenylphenol benzoate is sulfonated and the benzoyl group removed by hydrolysis. Kolbe carboxylation produces the desired 5(4-sulfophenyl)salicylic acid.

The third general method for converting compounds of Formula II to compounds of Formula I involves direct fluorination of starting materials having an unsubstituted 4'-position. In this method, the starting material is dissolved in a solvent such as a fluorocarbon e.g. carbontetrafluoride or hexafluoroethane, and treated with an equimolar amount of fluorine at any temperature, preferably at a temperature between —80° and 25° C. in the presence of an equimolar amount of a catalyst such as boron trifluoride. Lesser amount of the fluorinating agents may be used in proportion to the starting material with correspondingly reduced yields. Similarly, instead of using fluorine gas, other suitable fluorine sources are hexafluoroacetone fluorine adduct, chlorine trifluoride, phenyl iodo difluoroide, cobalt trifluoride, silver difluoride, manganese trifluoride, lead tetrafluoride and various other metal fluorides. Other solvents than fluorinated solvents may be used, it being understood that such solvents will accept fluorine and thus require the use of greater than equimolar amounts of fluorine to effect the desired conversion of the starting material. Direct fluorination may be conducted in the presence or absence of a source of acetyl ions, giving the compound of Formula I wherein A is acetyl or hydrogen, respectively.

After the above-described fluorination reactions have been conducted, the desired compound of Formula I can be separated from the reaction mixture and purified using conventional separation and purification techniques. Thus, 5-(4-fluorophenyl)salicylic acid may be sublimed from the reaction after prior removal of volatiles. Chromatography over silica gel and crystallization from benzene, ethyl acetate or carbon tetrachloride may also be used to recover the desired product in purified condition.

The following examples are presented to further illustrate the present invention.

EXAMPLE 1

Conversion of diazonium compound

One hundred grams (0.395 mole) of 5-(4-aminophenyl)salicylic acid were placed in 300 ml. of anhydrous hydrogen fluoride below 0° C. To this solution were slowly added 30.3 g. (0.44 mole) of sodium nitrite. When the 4'-diazonium fluoride had formed, the batch was heated in an autoclave to 90° C. and maintained at 90° C. for 5 hours. The reaction mixture was cooled and poured over 2 kg. of crushed ice. The product was filtered, decolorized in hot 2-propanol, and crystallized from 50% aqueous 2-propanol giving 5-(4-fluorophenyl) salicylic acid.

EXAMPLE 2

Conversion of fluorosulfonyl compound

One hundred grams of 5-(4-fluorosulfonylphenyl)-salicylic acid were dissolved in two liters of acetone and irradiated with a 400 watt Hanovia mercury lamp for 6 hours. The acetone was diluted with 2 liters of water and the crude product filtered and washed. It was decolorized and recrystallized from 50% aqueous 2-propanol giving pure 5-(4-fluorophenyl)salicylic acid.

The corresponding fluorosulfinyl compound can be converted to 5-(4-fluorophenyl)salicylic acid in the same manner.

EXAMPLE 3

Alternative conversion of fluorosulfonyl compound

One hundred grams of 5-(4-fluorosulfonylphenyl)-salicylic acid were intimately mixed with 0.5 g. of fluorotris(triphenylphosphine)rhodium, RhF (P$\phi_3$)$_3$. This mixture was heated to 255–275° C. under vacuum. As sulfur dioxide was evolved, the product, 5-(4-fluorophenyl) salicylic acid, was collected by sublimation.

Passing the same starting material over 5% palladium-on-carbon at 300° for a one-minute contact time also accomplishes the decomposition leading to the formation of 5-(4-fluorophenyl)salicylic acid.

EXAMPLE 4

Conversion of a fluorocarbonyl compound

One hundred grams of 5-(4-fluorocarbonylphenyl)-salicylic acid were intimately mixed with 0.5 g. of chlorotris(triphenylphosphine)rhodium. This mixture was heated to 250° C. under vacuum. As carbon monoxide was evolved, the product, 5-(4-fluorophenyl)salicylic acid was collected by sublimation.

EXAMPLE 5

Conversion of fluoroformyl compound

One hundred grams of 5-(4-fluorocarbonyloxyphenyl)-salicylic acid were intimately mixed with 5 g. of 5% palladium-on-carbon and heated to 300° C. for 8 hours in an atmosphere of nitrogen. 5-(4-fluorophenyl)salicylic acid was removed by sublimation as it formed during the reaction period.

The corresponding thiofluoroformyl compound can be converted to 5-(4-fluorophenyl)salicylic acid by any of the above methods.

EXAMPLE 6

Conversion of a peroxy compound

A solution of 100 ml. of dimethylsulfoxide (DMSO) and 200 ml. of anhydrous hydrogen fluoride was prepared and cooled to −80° C. One hundred grams of 5-[4-(2-hydroperoxy-2-propyl)phenyl]salicylic acid were added in small portions to the DMSO-HF solution at −80° C. in a Dry Ice-acetone bath. When the addition was complete, the slurry was stirred at −80° C. for one hour and then poured into 2 liters of water. The solids were filtered, slurried in one liter of hot 2-propanol and refiltered. The filtrate was diluted with one liter of water, heated to reflux and cooled to crystallize 5-(4-fluorophenyl)salicylic acid.

EXAMPLE 7

Conversion of bromo compound

One hundred grams of 3-hydroxy-6-(4-bromophenyl)-phthalic acid were heated with 100 g. of anhydrous potassium fluoride to 300° C. for 2 hours. After cooling, the batch was slurried with 500 ml. of N,N-dimethylformamide and then diluted further with one liter of cold water. The product was filtered and heated in one liter of hot 2-propanol and filtered. The filtrate was decolorized and diluted with hot water giving 5-(4-fluorophenyl) salicylic acid on cooling.

The corresponding 4'-tosyloxy and 4'-mesyloxy starting materials can be converted to 5-(4-fluorophenyl)-salicylic acid by similar treatment.

EXAMPLE 8

Direct fluorination

One hundred grams of 5-phenylsalicylic acid were slurried in one liter of anhydrous carbon tetrachloride with 5 g. of anhydrous cobaltous chloride. The slurry was cooled to 0° C. and chlorine trifluoride diluted with nitrogen was passed into the slurry at 5 g./hour for 6 hours until a total of 30 g. had been added. The reaction mixture was stirred at 0° C. for an additional 2 hours. The solids were then filtered and washed with carbon tetrachloride. The dried solids were decolorized and crystallized from 2-propanol, the first crop consisting mainly of 5-(4-chlorophenyl)-salicylic acid. The filtrate was diluted with an equal volume of water, heated and then cooled to crystallize 5-(4-fluorophenyl)salicylic acid.

EXAMPLE 9

Synthesis of 5-(4-aminophenyl)salicylic acid 0.1 mole 4-(4-aminophenyl)phenol is intimately mixed with 10 weights of finely powdered anhydrous potassium carbonate and heated to 240° C. for 5 hours under 1500 lbs. carbon dioxide pressure. After cooling and venting, the batch is slurried in 50 weights of water and the sodium 5-(4-aminophenyl)salicylate collected by filtration. Dissolution in water followed by adjustment of the pH to 5, precipitates 5-(4-aminophenyl)salicylic acid.

EXAMPLE 10

Synthesis of 5-(4-fluorosulfonylphenyl)salicylic acid

Substituting 4-(4-sulfophenyl)phenol for 4-(4-aminophenyl)phenol in the procedure of Example 9 and acidifying to pH 2 gives the product 5-(4-sulfophenyl)salicylic acid which is dried and stirred with 500 ml. of benzene, and 0.1 mole of POCl$_3$ for 3 hours at 40° C. The volatiles are removed and 0.5 mole of sodium fluoride in 500 ml. of acetonitrile is added, and after stirring for 6 hours at 25° C., the batch is once more evaporated to dryness. The resulting 5-(4-fluorosulfonylphenyl)salicylic acid is used in the above-described decomposition reaction.

Alternatively, 0.1 mole of 5-phenylsalicylic acid is treated with 5 moles of fluorosulfonic acid for 4 hours at 30–50° C. and the excess fluorosulfonic acid is removed. The resulting 5-(4-fluorosulfonylphenyl)salicylic acid and its isomers are used directly in the decomposition to give 5-(4-fluorophenyl)salicylic acid. In still another manner, the 4-fluorosulfonyl derivative is prepared when 5-phenylsalicylic acid benzoate is subjected to 4-fluorosulfonation and decomposed to 5-(4-fluorophenyl)salicylic acid. The benzoyl group may be removed by simple hydrolysis prior to decomposition. In this event, it may be advantageous to restore the sulfonic acid formed by hydrolysis to fluorosulfonic acid by treatment with POCl$_3$ and potassium fluoride.

EXAMPLE 11

Synthesis of 5-[4-(2-hydroperoxy-2-propyl)phenyl] salicylic acid

A mixture of 0.1 mole of 5-aminosalicylic acid, 200 ml. of cumene and 9.0 grams of iso-amylnitrite, is warmed on a steam bath until a vigorous reaction with evolution of gas sets in. This evolution is allowed to proceed without heating until it has subsided, and the mixture is then heated on the steam bath for an additional 3 hours. The excess cumene is removed in vacuo, and the residue is chromatographed on a silica gel column using petroleum benzene as eluant to yield 5-(4-isopropylphenyl)salicylic acid which is treated with air in benzene solution for 4 hours. The benzene is removed and the resulting 5-[4-(2-hydroperoxy-2-propyl)phenyl]salicylic acid used in the aforedescribed decomposition procedure.

EXAMPLE 12

Preparation of 4'-(3-carboxy-4-acetoxy)biphenyl-4-anisyliodonium fluoride

To a stirred solution of 0.10 mole of 4-iodoanisole in 260 g. of acetic anhydride and 0.12 mole of hydrogen fluoride held at 0 to 5° C. are slowly added 11.3 g. of 30% hydrogen peroxide. This solution is stirred for two hours at 0 to 5° C. The solution is cooled to −20° C. and 0.10 mole of O-acetyl 5-phenylsalicylic acid added in small portions over 15 minutes. After one hour at −20° C., and 12 hours at 0° C., the reaction mixture is kept at room temperature for one day. The reaction mixture is carefully diluted with 3 liters of water at 20 to 30° C. and the product, 4'-(3-carboxy-4-acetoxy)biphenyl-4-anisyliodonium fluoride, filtered and dried at room temperature.

EXAMPLE 13

Preparation of O-acetyl 5-(4-fluorophenyl)salicylic acid

One-tenth of a mole of 4'-(3-carboxy-4-acetoxy)biphenylyl-4-anisoyliodonium fluoride is placed in 200 ml. of anhydrous N,N-dimethylformamide and heated at 110 to 115° C. for 2 hours. The N,N-dimethylformamide is evaporated in vacuo below 60° C. to near dryness. The residual oil is crystallized from carbon tetrachloride giving the product O-acetyl 5-(4-fluorophenyl)salicylic acid, M.P. 143–145° C.

What is claimed is:
1. A compound of the formula

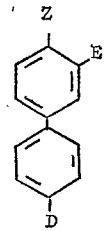

wherein
Z is hydroxyl or acetoxy;
E is carboxyl, and
D is diazonium fluoride.

References Cited
UNITED STATES PATENTS
3,218,300    11/1965    Kullmar et al. _____ 260—141 X JOSEPH REBOLD, Primary Examiner D. M. PAPUGA, Assistant Examiner U.S. Cl. X.R.

260—343.6, 346.6, 443, 455 B, 456 P, 463, 476 C, 479 R, 515 A, 516, 519, 520; 424—230; 204—158 R